United States Patent Office 3,309,396
Patented Mar. 14, 1967

3,309,396
1,1,3,3-TETRAMETHYL BUTYLAMINO-
METHYLENEMALONITRILE
Alexander T. Shulgin, Lafayette, Calif., assignor to The
Dow Chemical Company, Midland, Mich., a corporation of Delaware
No Drawing. Filed July 13, 1961, Ser. No. 123,650
2 Claims. (Cl. 260—465.5)

The present invention is concerned with new aminomethylenemalonitrile compounds corresponding to the formula $$R-NHCH=C(CN)_2$$

wherein R represents a member of the group consisting of (a) a straight chain alkyl radical containing from 1 to 10 carbon atoms, (b) a branched-chain alkyl radical containing from 4 to 8 carbon atoms; (c) an unsaturated straight-chain radical containing from 3 to 8 carbon atoms and up to and including one unsaturated linkage and that an ethylenic linkage; (d) a substituted methyl group corresponding to the formula $$-CH_2X$$

wherein X represents a monovalent aromatic nucleus which, independent of substituents, contains 6 carbon atoms, any substituents thereof being selected from halogen and lower alkyl, or wherein X represents a monovalent heterocyclic radical containing up to 6 nuclear atoms in the heterocyclic nucleus, up to 1 of said nuclear atoms being selected from nitrogen, oxygen, and sulfur, all other nuclear atoms being carbon, and any substituents thereupon being lower alkyl; or (e) wherein R represents a monovalent cycloaliphatic radical containing from 3 to 6, inclusive, carbon atoms and up to and including 1 substituent, such substituent being selected from lower alkyl and cycloaliphatic radicals being of from 3 to 6, inclusive carbon atoms.

The present compounds are crystalline solids of very low solubility in water but readily soluble in various organic solvents; the compounds are, in general, lightly colored, from off-white through salmon to tan in color. The compounds are useful as fungicides; they have also value as selective insecticides and herbicides. The compounds of the present invention are prepared by causing a reaction between a lower alkyloxymethylenemalononitrile and an appropriate amine, corresponding to the formula RNH$_2$. The reaction takes place between equimolecular proportions of the starting materials and, when it is desired to prepare the product in good yield, in high purity, without necessity for special steps of purification, the desired starting materials should preferably be employed in such proportions. However, the reactants may be combined in any proportions and unconsumed reactant of whatever identity recycled into the reaction mixture for further use.

The reaction goes forward at temperatures over a wide range from temperatures somewhat lower than room temperature up to the boiling temperature of a typical liquid reaction medium, such as a temperature in the range of from 100 to 150° C. The reaction is, in general, moderately exothermic. It is convenient and preferred to bring the reacting substances together at approximately room temperature. Under these conditions, there is typically a sharp rise in the temperature of the resulting reaction mixture. The extent of the temperature rise depends, among other factors, upon the amount of employed reactants, rate of combination of reactants, whether the reactants are employed in quantities such that the whole amount of each reactant is consumed, the amount and identity of liquid reaction medium if any, and whether external cooling is applied. In general, when reactants are employed in equimolecular proportions, in relatively large amounts in proportion to the employed liquid reaction medium and in proportion to the surface area of the reaction vessel, the temperature rise will tend to be relatively great. In contrast, when the amount of employed reactant is small or when the reaction is limited by a small limiting amount of one or the other of the reactants and especially in the presence of a relatively large amount of liquid reaction medium of which the specific heat tends to limit the temperature rise, the resulting rise of reaction temperature is relatively less.

Although it would usually be unnecessary, under industrial conditions, external cooling may, if desired, be employed to limit the resulting temperature of the reaction mixture to a temperature low enough that damage to the product does not result. Under laboratory conditions, as will more fully be exemplified hereinafter, this is seldom or never necessary.

When employing some of the less reactive of the starting materials to be employed in preparation of products of the present invention it may be desirable, following the initial temperature rise resulting from combination of the reacting substances, to apply external heat to elevate the temperature of the resulting reaction mixture briefly to force the reaction to completion.

Upon completion of the reaction, the desired product, which is of very low solubility in water and in various other reaction media, may usually be separated by simply filtering the resulting mixture whereby the product is removed as a solid which may be a waxy or coalescent solid. Alternatively, products may be extracted by the use of an organic solvent such as a dialkyl ether, a chlorinated lower aliphatic hydrocarbon and the like whereby product is taken into solution which solution is readily separated from aqueous or the like liquid reaction medium. Other separation, isolation, and purification procedures will be obvious to skilled chemists in view of the instant specification.

The resulting product may be purified to a considerable degree by washing with water; if desired it may be further purified by fractional crystallization from composite solvent systems and the like. Those skilled in the art of organic chemistry, with the following examples, will be able without more to practice the present invention. However, in view of the obvious permutations and combinations which may be readily made without affecting the operability of the methods of the present invention, the following examples are illustrative only and are not limiting.

*Example 1.—Butylaminomethylenemalononitrile*

To a suspension of 4.1 grams (0.034 mole) ethoxymethylenemalononitrile in 10 milliliters of water was added, in a single portion and with vigorous stirring, 2.5 gram (0.034 mole) normal butylamine. Both reactants were at room temperature. Evolved heat of reaction promptly elevated the temperature of the resulting reaction mixture to approximately 45° C. whereupon there formed an oily product layer distinct from the aqueous layer. The temperature of the resulting product mixture was permitted to equilibrate with room temperature whereupon the oily layer became partially solid and coalescent-flocculent. The product was separated from the aqueous medium by filtration and, on the filter paper, washed with water and thereafter air dried. As a result of these operations there was obtained 4.9 grams (0.033 mole, an almost perfect yield) of yellow, granular crystals, greasy in appearance, melting at 95–98° C. The product was found, upon analysis, to contain 28.06 percent by weight nitrogen as compared with the theoretical value of 28.17 percent.

The application of an aqueous dispersion of the product of the present example at the rate of 1 pound per 100 gallons as a wetting spray to the leaves of young bean plants heavily infested with larvae of the Mexican bean beetle resulted in a 100% kill of the bean beetle larvae without serious injury to the bean plants. The application of an aqueous dispersion containing ½ gram of the said product per 100 milliliters of resulting aqueous dispersion to young tomato plants afforded satisfactory commercial protection of the said tomato plants from subsequent infestation by tomato early blight when the plants were sprayed with an inoculum of viable spores of the said fungus, whereas a similar group of young tomato plants not protected by the present compound but similarly inoculated became seriously infested and many of the plants died.

In similar preparations, employing ethoxymethylenemalononitrile in water and an equimolecular amount of normal decylamine there is prepared a normal decylaminomethylenemalononitrile compound which, in the form of an aqueous dispersion affords protection to plants from subsequent inoculation with spores of tomato early blight.

*Example 2.—1,1,3,3-tetramethylbutylaminomethylenemalononitrile*

The procedures of the present example were essentially similar to those of Example 1. To a suspension of 4.1 grams (0.034 mole) ethoxymethylenemalononitrile in 10 milliliters of water there was added, at once in a single portion and with vigorous stirring, 4.8 grams (0.033 mole) tertiaryoctylamine (1,1,3,3 - tetramethylbutylamine) at room temperature. The resulting reaction mixture became distinctly warm to the hand and was thereafter briefly externally heated to an upper limit temperature of 80° C. at which it was maintained for approximately 2 minutes to carry the reaction to completion. As a result of these procedures there was formed an insoluble product which was separated by filtration and recrystallized from a chloroform-hexane mixture to obtain 4.2 grams (0.028 mole, approximately 85% of theoretical maximum based upon tertiaryoctylamine, the limiting reactant) of a tan crystalline 1,1,3,3-tetramethylbutylaminomethylenemalononitrile product melting at 162–164° C. The product was tested in the form of an aqueous dispersion and found to give commercially highly satisfactory protection to young tomato plants subsequently inoculated with living spores of *Alternaria solani*, tomato early blight.

In similar procedures, employing tertiarybutylamine there is prepared a tertiarybutylaminomethylenemalononitrile product which is fungicidal against early blight of tomatoes and plant pathogenic fungi.

*Example 3.—Cyclohexylcyclohexylaminomethylenemalononitrile*

The procedures in the present example were essentially similar to those in the examples foreing except that, in view of the known tendency of bicyclohexylamine to be unstable under atmospheric conditions, the employed amine was freshly prepared from its hydrochloride immediately prior to its employment in preparation of the malononitrile compound.

In particular, 10.9 grams (0.049 mole) cyclohexylcyclohexylamine hydrochloride was neutralized with aqueous sodium hydroxide whereby to liberate cyclohexylcyclohexylamine. The resulting aqueous material was extracted with diethyl ether. From the resulting ether extract the ether solvent was removed by gently warming under subatmospheric pressure. To the remaining cyclohexylcyclohexylamine was added 5 milliliters warm ethanol. The resulting ethanol solution was thereafter promptly employed in preparation of the malononitrile.

The ethanol solution of bicylclohexylamine, prepared as above described, was intimately mixed and stirred into 6.1 grams (0.050 mole) ethoxymethylenemalononitrile in 10 milliliters water. Reaction ensued and an insoluble product precipitated in the resulting reaction mixture. The malononitrile product was separated therefrom by filtration and washed with water to obtain 9.4 grams (0.037 mole) of a light tan solid cyclohexylcyclohexylaminomethylenemalononitrile product melting at 265–267° C. The product was tested and found to be fungicidal against viable spores of tomato early blight and to give good protection to young tomato plants against subsequent inoculation with said spores.

In similar preparation, employing cyclohexylamine, there is prepared a light tan solid crystalline cyclohexylaminomethylenemalononitrile. It is fungicidal against live spores of tomato early blight.

*Example 4.—Allylaminomethylenemalononitrile*

In procedures essentially the same as those of Example 1 and the other foregoing examples, 2 grams (0.035 mole) allylamine was added to a suspension of 4.1 grams (0.034 mole) ethoxymethylenemalononitrile in 10 milliliters water. From the resulting reaction mixture was separated and washed with water 4.5 grams (0.034 mole) of a light tan allylaminomethylenemalononitrile product melting at 75–77° C. The product was tested and found to be fungicidal against live spores of tomato early blight; it was also insecticidal and application at a relatively low rate gave good control of larvae of Mexican bean beetle feeding upon young plants.

In similar prepartion, employing 5-octenylamine, there is prepared a 5-octenylaminomethylenemalononitrile product as a tan crystalline solid which is fungicidal to spores of various plant pathogenic fungi.

*Example 5.—Benzylaminomethylenemalononitrile*

In preparation similar to the foregoing, and in particular essentially similar to the preparation of Example 1, employing benzylamine as amine reactant, there is prepared benzylaminomethylenemalononitrile product as a tan crystalline solid possessing fungicidal properties against viable spores of various plant pathogenic fungi.

Also, employing p-ethylbenzylamine, there is prepared p-ethylbenzylaminomethylenemalononitrile. Similarly, employing p-chlorobenzylamine as amine reactant there is prepared a p-chlorobenzylaminomethylenemalononitrile product. Also, employing o-bromobenzylamine, as a reactant there is prepared an o-bromobenzylaminomethylenemalononitrile product. The benzylaminomethylenemalononitrile products are toxic to various plant pathogenic fungi, notably to the germinant spores thereof.

*Example 6.—Furfurylaminomethylenemalononitrile*

In procedures essentially the same as the foregoing, 3.3 grams (0.034 mole) furfurylamine was combined with a suspension of 4.1 grams (0.034 mole) ethoxymethylenemalononitrile in 10 milliliters water. From the resulting reaction mixture there were separated 4.8 grams (0.028 mole) salmon colored water-insoluble crystals of a furfurylaminomethylenemalononitrile product melting at a temperature in the range 97–106° C. The crystals had a distinctive surficial gloss and appeared greasy. An aqueous preparation containing ½ pound of the said furfurylaminomethylenemalononitrile product per 100 gallons of ultimate aqueous dispersion afforded excellent protection to a group of young tomato plants against subsequent inoculation with live spores of tomato early blight whereas a similar group of tomato plants unprotected and similarly inoculated became heavily infested and most of them died.

In similar preparation, employing pyrrolylmethylamine as amine reactant there is prepared a pyrrolylmethylaminomethylenemalononitrile product.

Similarly, employing thenylamine there is prepared a thenylaminomethylenemalononitrile product. The heterocyclic aminomethylenemalononitrile products are toxic to spores of plant pathogenic fungi.

The present compounds are useful as herbicides and insecticides and have been shown to be especially adapted to be employed in the control of fungous diseases of desired plants. For such use, the compounds may be dispersed upon an inert finely divided solid and the resulting preparation employed as a dust. Also, such preparations may be dispersed in water with or without a wetting agent and the resulting aqueous dispersions used as sprays. In other procedures the compounds may be employed in oil or as a constituent of oil-in-water or water-in-oil emulsions or as aqueous dispersions thereof which may be applied as spray, drench, or wash.

I claim:
1. Allylaminomethylenemalononitrile.
2. 1,1,3,3-tetramethylbutylaminomethylenemalononitrile.

References Cited by the Examiner

UNITED STATES PATENTS 2,928,831   3/1960   Surrey ------------ 260—247.5

OTHER REFERENCES

Eiden, Agnew Chem., vol. 72 (1960), page 77.
Passalacqua Gazz. Chim. Ital., vol. 43, II pages 566–9 (1913).

ALEX MAZEL, *Primary Examiner.*
IRVING MARCUS, JOHN D. RANDOLPH, *Examiner*
NICHOLAS S. RIZZO, WALTER A. MODANC
HENRY R. JILES, *Assistant Examiners.*